United States Patent
Blanchard et al.

(10) Patent No.: US 11,128,675 B2
(45) Date of Patent: Sep. 21, 2021

(54) AUTOMATIC AD-HOC MULTIMEDIA CONFERENCE GENERATOR

(71) Applicant: AT&T Intellectual Property I, L.P., Atlanta, GA (US)

(72) Inventors: Harry E. Blanchard, Rumson, NJ (US); Robert King, Roswell, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 622 days.

(21) Appl. No.: 15/463,660

(22) Filed: Mar. 20, 2017

(65) Prior Publication Data

US 2018/0270277 A1 Sep. 20, 2018

(51) Int. Cl.
| | |
|---|---|
| *H04L 12/58* | (2006.01) |
| *H04L 29/06* | (2006.01) |
| *G06Q 30/02* | (2012.01) |
| *G06Q 50/00* | (2012.01) |
| *G06F 3/0482* | (2013.01) |
| *G06F 3/0484* | (2013.01) |
| *H04L 12/18* | (2006.01) |

(Continued)

(52) U.S. Cl.
CPC .......... *H04L 65/1069* (2013.01); *G06F 40/30* (2020.01); *G06Q 10/10* (2013.01); *H04L 12/1822* (2013.01); *H04L 12/1831* (2013.01); *H04L 51/10* (2013.01); *H04L 51/32* (2013.01); *H04L 65/1016* (2013.01); *H04L 65/4076* (2013.01); *H04L 65/4084* (2013.01); *G10L 15/26* (2013.01)

(58) Field of Classification Search
CPC ............. H04L 65/1069; H04L 12/1822; H04L 12/1831; H04L 51/10; H04L 51/32; H04L 65/1016; H04L 65/4076; H04L 65/4084; G06F 17/2785; G06Q 10/10; G10L 15/26
USPC ....................................................... 709/204
See application file for complete search history.

(56) References Cited

U.S. PATENT DOCUMENTS

| | | | |
|---|---|---|---|
| 5,701,340 A | 12/1997 | Zwick et al. | |
| 6,275,812 B1 | 8/2001 | Haq et al. | |

(Continued)

FOREIGN PATENT DOCUMENTS

| | | |
|---|---|---|
| CA | 2437164 A1 | 8/2002 |
| EP | 2403236 A1 | 1/2012 |

(Continued)

OTHER PUBLICATIONS

Matsuo, Yutaka et al., "Mining social network of conference participants from the web", Web Intelligence, Proceedings. IEEE/WIC International Conference on. IEEE, 2003.

(Continued)

*Primary Examiner* — Kevin T Bates
*Assistant Examiner* — Golam Mahmud
(74) *Attorney, Agent, or Firm* — Guntin & Gust, PLC; Robert Gingher

(57) ABSTRACT

Aspects of the subject disclosure may include, for example, a method including steps of determining, by a processing system including a processor, a topic in a social media stream, offering, by the processing system, a conference concerning the topic, wherein said offer is made in the social media stream, receiving, by the processing system, acceptances to participate in the conference, and hosting, by the processing system, the conference. Other embodiments are disclosed.

20 Claims, 7 Drawing Sheets

(51) Int. Cl.
*G06Q 10/10* (2012.01)
*G06F 40/30* (2020.01)
*G10L 15/26* (2006.01)

(56) References Cited

U.S. PATENT DOCUMENTS

| | | | |
|---|---|---|---|
| 6,654,588 B2 | 11/2003 | Moskowitz et al. | |
| 6,681,398 B1 | 1/2004 | Verna et al. | |
| 7,151,540 B2 | 12/2006 | Young | |
| 7,152,092 B2 * | 12/2006 | Beams | G09B 5/00 |
| | | | 709/204 |
| 7,370,276 B2 | 5/2008 | Willis | |
| 7,448,063 B2 | 11/2008 | Freeman | |
| 7,454,615 B2 * | 11/2008 | O'Neil | H04L 63/083 |
| | | | 380/270 |
| 7,507,091 B1 | 3/2009 | Aleali et al. | |
| 7,562,117 B2 | 7/2009 | Rosenberg et al. | |
| 7,593,860 B2 | 9/2009 | Mitchell | |
| 7,870,494 B2 | 1/2011 | Lentz et al. | |
| 8,392,503 B2 | 3/2013 | Kuhlke et al. | |
| 8,412,564 B1 | 4/2013 | Thell et al. | |
| 8,417,653 B2 | 4/2013 | Probst et al. | |
| 8,442,922 B2 | 5/2013 | Martin et al. | |
| 8,463,775 B2 | 6/2013 | Chowdhury et al. | |
| 8,468,253 B2 | 6/2013 | Guzman et al. | |
| 8,477,921 B2 | 7/2013 | Chen et al. | |
| 8,494,436 B2 | 7/2013 | Morgia et al. | |
| 8,516,105 B2 | 8/2013 | Chawla et al. | |
| 8,522,289 B2 | 8/2013 | Athsani et al. | |
| 8,539,027 B1 | 9/2013 | Zhu et al. | |
| 8,539,359 B2 | 9/2013 | Rapaport et al. | |
| 8,543,454 B2 | 9/2013 | Rishel et al. | |
| 8,565,689 B1 * | 10/2013 | Rubin | G08C 15/00 |
| | | | 455/67.11 |
| 8,606,742 B1 * | 12/2013 | Kim | G06Q 10/10 |
| | | | 706/54 |
| 8,610,786 B2 | 12/2013 | Ortiz et al. | |
| 8,666,961 B1 | 3/2014 | Qureshi et al. | |
| 8,670,018 B2 | 3/2014 | Cunnington et al. | |
| 8,712,944 B1 * | 4/2014 | Kim | G06Q 50/01 |
| | | | 706/45 |
| 8,713,102 B2 | 4/2014 | Bechtel et al. | |
| 8,750,472 B2 | 6/2014 | Shun et al. | |
| 8,762,302 B1 | 6/2014 | Mousavi et al. | |
| 8,764,652 B2 | 7/2014 | Lee et al. | |
| 8,775,431 B2 | 7/2014 | Jason | |
| 8,825,711 B2 | 9/2014 | Chan et al. | |
| 8,875,177 B1 | 10/2014 | Sharma et al. | |
| 8,887,070 B1 * | 11/2014 | Hecht | H04M 3/567 |
| | | | 715/753 |
| 8,892,079 B1 | 11/2014 | Nace et al. | |
| 8,904,296 B2 | 12/2014 | Sahai et al. | |
| 8,935,274 B1 | 1/2015 | Mihailovici et al. | |
| 8,977,641 B1 * | 3/2015 | Crichton | G06Q 50/01 |
| | | | 707/767 |
| 8,983,924 B2 | 3/2015 | Portnoy et al. | |
| 9,009,126 B2 | 4/2015 | Spivack et al. | |
| 9,009,298 B2 | 4/2015 | Besehanic et al. | |
| 9,015,196 B2 | 4/2015 | Hua et al. | |
| 9,020,832 B2 | 4/2015 | Malinovsky et al. | |
| 9,065,877 B2 | 6/2015 | Abrams | |
| 9,177,346 B2 | 11/2015 | Ahrens et al. | |
| 9,189,143 B2 | 11/2015 | Jones et al. | |
| 9,210,477 B2 | 12/2015 | Pacor et al. | |
| 9,257,122 B1 | 2/2016 | Cancro et al. | |
| 9,390,404 B2 | 7/2016 | Ivanic et al. | |
| 9,466,049 B2 | 10/2016 | Dehaan et al. | |
| 9,710,819 B2 * | 7/2017 | Cloran | G06Q 30/02 |
| 10,095,686 B2 * | 10/2018 | Zhang | G06Q 50/10 |
| 10,387,504 B1 * | 8/2019 | Kolcz | H04L 67/306 |
| 10,560,662 B1 * | 2/2020 | Tippana | H04L 51/16 |
| 2002/0049786 A1 | 4/2002 | Bibliowicz et al. | |
| 2002/0120752 A1 | 8/2002 | Logan et al. | |
| 2002/0142278 A1 | 10/2002 | Whitehurst et al. | |
| 2003/0014491 A1 | 1/2003 | Horvitz et al. | |
| 2003/0052911 A1 | 3/2003 | Cohen-solal et al. | |
| 2003/0093784 A1 | 5/2003 | Dimitrova | |
| 2003/0093797 A1 | 5/2003 | Bazzaz et al. | |
| 2003/0233242 A1 | 12/2003 | Wenger | |
| 2003/0236907 A1 | 12/2003 | Stewart et al. | |
| 2004/0002885 A1 | 1/2004 | Levy | |
| 2004/0111467 A1 | 6/2004 | Willis | |
| 2005/0027581 A1 | 2/2005 | Kjesbu et al. | |
| 2005/0034079 A1 * | 2/2005 | Gunasekar | G06Q 10/10 |
| | | | 715/753 |
| 2005/0131744 A1 | 6/2005 | Brown et al. | |
| 2005/0188399 A1 | 8/2005 | Tischer et al. | |
| 2005/0193421 A1 | 9/2005 | Cragun et al. | |
| 2005/0228762 A1 | 10/2005 | D'Elena et al. | |
| 2005/0246165 A1 | 11/2005 | Pettinelli et al. | |
| 2006/0015393 A1 | 1/2006 | Eisma et al. | |
| 2006/0026231 A1 * | 2/2006 | Degenhardt | G06Q 10/10 |
| | | | 709/204 |
| 2006/0174297 A1 | 8/2006 | Anderson et al. | |
| 2006/0188860 A1 | 8/2006 | Morrison | |
| 2007/0005752 A1 | 1/2007 | Chawla et al. | |
| 2007/0100939 A1 | 5/2007 | Bagley et al. | |
| 2008/0052377 A1 | 2/2008 | Light | |
| 2008/0134235 A1 | 6/2008 | Kalaboukis et al. | |
| 2008/0178302 A1 | 7/2008 | Brock et al. | |
| 2008/0209516 A1 | 8/2008 | Nassiri | |
| 2008/0244418 A1 | 10/2008 | Manolescu et al. | |
| 2008/0300937 A1 | 12/2008 | Allen et al. | |
| 2008/0320082 A1 | 12/2008 | Kuhlke et al. | |
| 2009/0080635 A1 * | 3/2009 | Altberg | H04L 65/1069 |
| | | | 379/216.01 |
| 2009/0089352 A1 | 4/2009 | Davis et al. | |
| 2009/0138332 A1 | 5/2009 | Kanevsky et al. | |
| 2009/0164573 A1 | 6/2009 | Bravery et al. | |
| 2009/0240516 A1 | 9/2009 | Palestrant | |
| 2010/0037151 A1 * | 2/2010 | Ackerman | H04L 65/4015 |
| | | | 715/753 |
| 2010/0070448 A1 | 3/2010 | Omoigui | |
| 2010/0088159 A1 | 4/2010 | Henshaw et al. | |
| 2010/0199295 A1 | 8/2010 | Katpelly et al. | |
| 2011/0054968 A1 * | 3/2011 | Galaviz | G06Q 10/06 |
| | | | 705/7.28 |
| 2011/0090347 A1 | 4/2011 | Buckner et al. | |
| 2011/0271197 A1 * | 11/2011 | Jones | H04L 12/1822 |
| | | | 715/739 |
| 2011/0292162 A1 | 12/2011 | Byun et al. | |
| 2011/0295392 A1 | 12/2011 | Cunnington et al. | |
| 2011/0306325 A1 | 12/2011 | Gutta et al. | |
| 2012/0072939 A1 | 3/2012 | Crenshaw et al. | |
| 2012/0102050 A1 | 4/2012 | Button et al. | |
| 2012/0127257 A1 | 5/2012 | Lu et al. | |
| 2012/0159331 A1 | 6/2012 | Greve et al. | |
| 2012/0179981 A1 * | 7/2012 | Whalin | H04W 4/21 |
| | | | 715/753 |
| 2012/0190386 A1 | 7/2012 | Anderson | |
| 2012/0197824 A1 | 8/2012 | Donovan et al. | |
| 2012/0296991 A1 | 11/2012 | Spivack et al. | |
| 2012/0330950 A1 | 12/2012 | Pichumani et al. | |
| 2013/0007009 A1 | 1/2013 | Caldwell et al. | |
| 2013/0019187 A1 | 1/2013 | Hind et al. | |
| 2013/0041947 A1 * | 2/2013 | Sammon | H04M 7/0024 |
| | | | 709/204 |
| 2013/0104070 A1 | 4/2013 | Blake et al. | |
| 2013/0124623 A1 | 5/2013 | Munter et al. | |
| 2013/0171594 A1 | 7/2013 | Gorman et al. | |
| 2013/0275135 A1 | 10/2013 | Morales et al. | |
| 2013/0275884 A1 | 10/2013 | Katragadda et al. | |
| 2013/0304818 A1 | 11/2013 | Brumleve et al. | |
| 2014/0036090 A1 | 2/2014 | Black et al. | |
| 2014/0046955 A1 | 2/2014 | Dollard | |
| 2014/0101085 A1 | 4/2014 | Lu et al. | |
| 2014/0122588 A1 | 5/2014 | Nimri et al. | |
| 2014/0123027 A1 | 5/2014 | Kozloski et al. | |
| 2014/0188538 A1 | 7/2014 | Dasgupta et al. | |
| 2014/0195675 A1 | 7/2014 | Silver et al. | |
| 2014/0201173 A1 | 7/2014 | Roth et al. | |
| 2014/0212853 A1 | 7/2014 | Divakaran et al. | |

(56) References Cited

U.S. PATENT DOCUMENTS

| | | |
|---|---|---|
| 2014/0214404 A1* | 7/2014 | Kalia ..................... G06F 40/40 704/9 |
| 2014/0368604 A1 | 8/2014 | Lalonde |
| 2014/0267747 A1 | 9/2014 | Kritt et al. |
| 2014/0327779 A1 | 11/2014 | Eronen et al. |
| 2014/0356839 A1 | 12/2014 | Dozier et al. |
| 2014/0362165 A1* | 12/2014 | Ackerman .......... H04L 65/4076 348/14.07 |
| 2014/0363000 A1 | 12/2014 | Bowden |
| 2014/0379729 A1* | 12/2014 | Savage .................. H04L 51/14 707/748 |
| 2015/0032813 A1 | 1/2015 | Doshi |
| 2015/0121246 A1 | 4/2015 | Poore et al. |
| 2015/0128014 A1* | 5/2015 | Monroe ................ G06F 3/0482 715/202 |
| 2015/0142888 A1* | 5/2015 | Browning ............... H04L 67/22 709/204 |
| 2015/0172227 A1* | 6/2015 | Grove, II ................ H04L 51/32 709/206 |
| 2015/0180820 A1 | 6/2015 | Lee et al. |
| 2015/0188967 A1 | 7/2015 | Paulauskas et al. |
| 2015/0317647 A1 | 11/2015 | Jorge et al. |
| 2015/0341410 A1 | 11/2015 | Schrempp et al. |
| 2016/0065637 A1 | 3/2016 | O'malley |
| 2016/0170967 A1* | 6/2016 | Allen ..................... G10L 25/63 704/9 |
| 2016/0170968 A1* | 6/2016 | Allen ..................... G06F 40/30 434/322 |
| 2016/0291921 A1 | 10/2016 | Miller et al. |
| 2016/0294890 A1 | 10/2016 | Miller |
| 2016/0294894 A1* | 10/2016 | Miller ............... G06F 16/24578 |
| 2016/0344667 A1* | 11/2016 | Lane .................. G06Q 10/103 |
| 2016/0381111 A1 | 12/2016 | Barnett et al. |
| 2017/0060917 A1* | 3/2017 | Marsh ................. G06F 16/433 |
| 2017/0083628 A1* | 3/2017 | Frenkel ............. G06Q 30/0251 |
| 2017/0169726 A1 | 6/2017 | Aguirre |
| 2017/0214650 A1* | 7/2017 | Balasaygun ........ H04L 65/4007 |
| 2017/0223064 A1* | 8/2017 | Le Devehat ........ H04L 65/1069 |
| 2017/0251078 A1 | 8/2017 | Shaw |
| 2017/0255701 A1 | 9/2017 | Pratt |
| 2017/0353510 A1* | 12/2017 | Levine .................... H04M 3/18 |

FOREIGN PATENT DOCUMENTS

| | | |
|---|---|---|
| WO | 0118723 A2 | 3/2001 |
| WO | 2009035618 A2 | 3/2009 |
| WO | 2011035286 A1 | 3/2011 |
| WO | 2011143342 A1 | 11/2011 |
| WO | 2014093668 A1 | 6/2014 |

OTHER PUBLICATIONS

Reuter, Jack et al., "Segmenting Twitter Hashtags", International Journal on Natural Language Computing, vol. 5, No. 4, Aug. 2016, 14 pages.

"More Camera Angles, More Choice—You Call the Shots in Today's Sports Viewing World", LostRemote, adweek.com, Sep. 10, 2014.

"Streamweaver: split-screen synchronicity", Streamveaver, streamweaver.com, Jan. 13, 2013.

"Switchcam", Switchcam.com, Nov. 2, 2011.

Collins, Linda J., "Livening up the classroom: Using audience response systems to promote active learning", Medical reference services quarterly 26.1 (2007): 81-88.

Herlocker, Jonathan L., "Understanding and improving automated collaborative filtering systems." Diss. University of Minnesota, 2000.

John, Ajita, "Collaborative tagging and expertise in the enterprise." Collab. Web Tagging Workshop, 2006.

Kulyk, Olga et al., "Real-time feedback on nonverbal behaviour to enhance social dynamics in small group meetings", Machine Learning for Multimodal Interaction. Springer Berlin Heidelberg, 2006. 150-161.

McDonald, David W. et al., "Expertise recommender: a flexible recommendation system and architecture." Proceedings of the 2000 ACM conference on Computer supported cooperative work. ACM, 2000.

Medina, Melissa S. et al., "Use of an audience response system. (ARS) in a dual-campus classroom environment", American Journal of Pharmaceutical Education 72.2 (2008).

* cited by examiner

300

AUTOMATIC AD-HOC MULTIMEDIA CONFERENCE GENERATOR

FIELD OF THE DISCLOSURE

The subject disclosure relates to an automated ad-hoc conference generator. More particularly, the disclosure relates to an automated assistant or moderator that actively identify topics and create ad-hoc audio video conference rooms for deeper topic discussion.

BACKGROUND

Currently, automated systems can identify and transcribe the contents of conversations using various natural language understanding, speech recognition, and data-based algorithms. However, conversations over social media may be hampered by the media, texting is less rich than an audio/video conference. Additionally, correspondents may not be connected to others discussing the same topic in different social media contexts.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for an automatic ad-hoc conference generator. Other embodiments are described in the subject disclosure.

One or more components, steps or features described with respect to the exemplary embodiments herein can be utilized in conjunction with or replaced by one or more components, steps or features described by U.S. patent application, Ser. No. 14/963,287, filed Dec. 9, 2015, by Aguirre et al., entitled "METHOD AND APPARATUS FOR MANAGING FEEDBACK BASED ON USER MONITORING," U.S. patent application, Ser. No. 15/053,725, filed Feb. 25, 2016, by Shaw et al., entitled "METHOD AND APPARATUS FOR PROVIDING CONFIGURABLE EVENT CONTENT," and U.S. patent application, Ser. No. 15/063,035, filed Mar. 7, 2016, by Pratt et al., entitled "METHOD AND SYSTEM FOR PROVIDING EXPERTISE COLLABORATION." All sections of the aforementioned applications are incorporated by reference herein in their entirety.

One or more aspects of the subject disclosure include a server device, comprising: a memory that stores executable instructions; and a processor communicatively coupled to the memory, wherein the processor, responsive to executing the executable instructions, performs operations comprising: deriving a topic from a plurality of social media streams; obtaining identification information of a social media group associated with the plurality of social media streams; inviting members of the social media group to attend a conference on the topic based on the identification information; identifying a group of conference users participating in the conference; determining feedback data associated with the group of conference users; and providing feedback information indicative of the feedback data via a social media stream in the plurality of social media streams.

One or more aspects of the subject disclosure include a machine-readable storage medium, comprising executable instructions that, when executed by a processing system including a processor, facilitate performance of operations, comprising: identifying one or more topics from a social media stream; determining whether a sufficient level of interest exists in the one or more topics; inviting participants of the social stream to attend a conference on the one or more topics; determining feedback data associated with the conference; and providing feedback information indicative of the feedback data.

One or more aspects of the subject disclosure include a method, comprising: determining, by a processing system including a processor, a topic in a social media stream; offering, by the processing system, a conference concerning the topic, wherein said offer is made in the social media stream; receiving, by the processing system, acceptances to participate in the conference; and hosting, by the processing system, the conference.

Figure 1:
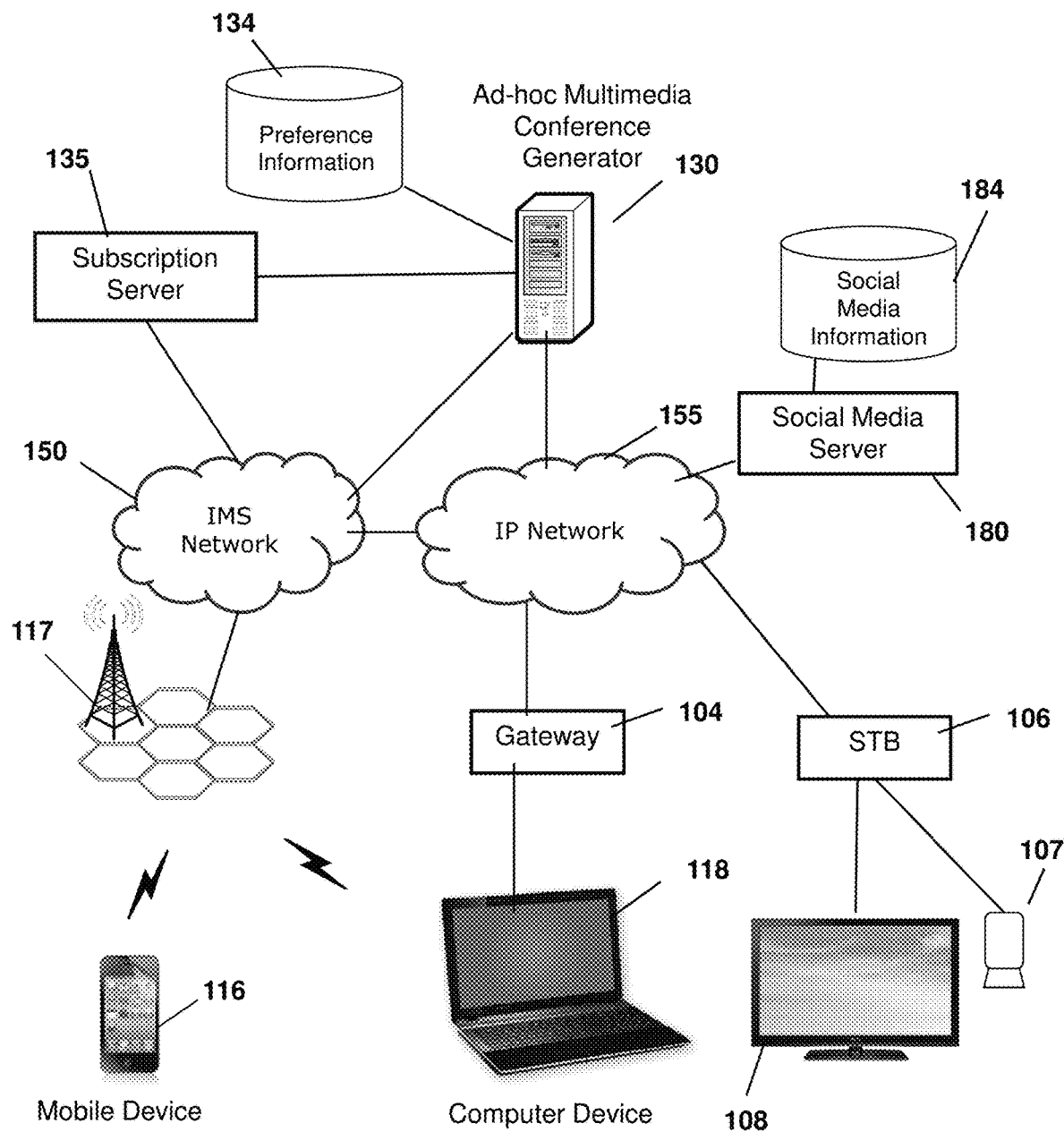
FIG. 1 depicts an illustrative embodiment of a system for creating an ad-hoc audio, video or multimedia conference.

FIG. 1 depicts an illustrative embodiment of a communication system 100 for creating an ad-hoc audio, video or multimedia conference. The communication system 100 can provide wireless communication services, including voice, video data and/or messaging services to mobile communications devices 116 and other computer devices 118. The communication system 100 can provide wireline communication services, such as serving as an Internet Service Provider (ISP) for computer devices 118. The communication system 100 can provide subscription television services via wired and/or wireless communications. For example, the communication system 100 can provide and receive streaming media content to/from a mobile communication device 116, via a cellular link to cellular base stations 117, to a computer device 118, via a wired or wireless gateway 104, or to a television display monitor 108 optionally including a camera 107, via a media processor device 106. Communication system 100 can enable wireless communication services over a number of different networks, such as between mobile communication devices 116 and computer devices 118. Mobile communication devices 116 can include a number of different types of devices that are capable of voice, video, data and/or messaging communications, including cellular phones, smartphones, personal computers, media processing devices, and so forth.

In one or more embodiments, the communication system 100 can provide access to an Internet Protocol (IP) Multimedia Subsystem (IMS) network 150 to facilitated combined services of circuit-switched and packet-switched systems. The IMS network 150 can be accessed, for example, via one or more cellular base stations 117. For example, a mobile communication device 116 can connect to a cellular base station 117 via a wireless communication signal. The mobile communication device 116 can communication, via the IMS network 150, with other mobile communication devices, with landline communication devices, and with an Internet Protocol (IP) network 155, such as the Internet or the world-wide web (WWW). The communication system 100 can provide communications and sharing of various resources between mobile communication devices 116 and various devices, such as computer devices 118, which are connected to the IP network 155.

In one or more embodiments, the communication system 100 can include an ad-hoc multimedia conference generator 130. The ad-hoc multimedia conference generator 130 can examine one or more social media stream(s) from a social media server 180, determine topics for discussion, propose a conference to the participants in the social media stream(s), monitor the conference, and provide feedback concerning the conference to the social media stream(s). For example, like a teacher who, in conversation with students over topics, may suggest to a group of students to move together and have a discussion, the ad-hoc multimedia conference generator can suggest that the participants to one or more social media stream(s) participate in a conference.

In one or more embodiments, a subscriber can register with the ad-hoc multimedia conference generator 130 from a device, such a mobile communication device 116, a computer device 118, or a media processor device 106. In one example, a subscriber using a mobile communication device 116 can connect to the ad-hoc multimedia conference generator 130 via the IMS network 150. The ad-hoc multimedia conference generator 130 can be accessed by a client application executing at the mobile communication device 116. In one or more embodiments, the ad-hoc multimedia conference generator 130 can access a subscription server 135 to authenticate the subscriber and/or the mobile communication device 116. The client application can require the subscriber to enter verification information, such as a username and passcode, which can be authenticated against a subscriber profile that is maintained at the subscription server 135. In another example, the subscription server can maintain verification information for the mobile communication device 116, itself, such that the subscriber does not need to enter verification information. In one or more embodiments, the subscriber can access the ad-hoc multimedia conference generator 130 via the IP network 155 using, for example, a gateway 104. The computer device 118 can use a client application or a general purpose browser to contact the ad-hoc multimedia conference generator 130 via a portal. The ad-hoc multimedia conference generator 130 can use the subscription server 135 for authenticating portal access by the computer device 118 using subscriber and/or machine verification. In one or more embodiments, the television display monitor 108 can access the ad-hoc multimedia conference generator 130 via a media processor device 106, such as a set-top box. The media processor device 106 can communicate with the ad-hoc multimedia conference generator 130 via the IP network 155 and/or a private network. The ad-hoc multimedia conference generator 130 can authentic the media processor device 106 via the subscription server 135. In one or more embodiments, the ad-hoc multimedia conference generator 130 can connect and communicate with devices 116, 118, and 106 for providing conferencing services using other techniques, such as satellite communication links and optical links.

In one or more embodiments, the ad-hoc multimedia conference generator 130 can maintain preference information 134 that is associated with subscribers to the conference services. The preference information can include preferences for how conferences are delivered, types of devices 106, 116 and/or 118 that the subscriber uses, and types of social media that the subscriber prefers. In one or more embodiments, the preference information 134 can include subscriber preferences that are particular to the selection and presentation of social media streams. For example, the subscriber may prefer to continuously view, at a large window of her television display monitor 108, a conference from a main media stream that depicts the "directed" feed of the conference. Meanwhile, she also wants to view, at a smaller window on the display, a sequence of other participants in the conference. Or, the subscriber may wish to view, for example, a whiteboard on the large window of her television display monitor 108 and the current speaker on her mobile device 116. The ad-hoc multimedia conference generator 130 can maintain these preferences in the preference information to link, for example, a particular subscriber (e.g., Anna) with a particular type of conference (e.g., chat room, audio only, audio/visual, or multimedia).

In one or more embodiments, the preference information can include past preferences and configurations that the subscriber has selected, as well as preferences and configurations that the ad-hoc multimedia conference generator 130 has derived for the subscriber. The subscriber can provide preferences by entering information, responding to queries during participation in a conference (e.g., "Do you prefer configuration A or B"), and/or by accepting default configurations. The ad-hoc multimedia conference generator 130 can monitor for changes in preferences by comparing current preferences to past preference, and determine whether to update the subscriber's preferences. In one embodiment, the ad-hoc multimedia conference generator 130 can update the subscriber's preference information every time the subscriber requests a different configuration or accepts a suggested configuration from the ad-hoc multimedia conference generator 130. In another embodiment, the ad-hoc multimedia conference generator 130 can determine if a change in a preference during a current media conference is significant enough to trigger an update in the preference information that is saved at the preference information database 134. For example, the subscriber may have a preferred configuration that provides a rule that may be configured in settings (with appropriate defaults) so that a particular number of individuals are needed for a quorum (or not) before participating in a conference, or that viewing the number of people in a chat room, for example, before joining themselves.

In one or more embodiments, the ad-hoc multimedia conference generator 130 can derive preference information 134 for the subscriber and recommend configuration changes (or an entirely different configuration) to the subscriber for acceptance or rejection. In one or more embodiments, the recommended configuration changes can be based on social media information that is associated with the subscriber. The subscriber can be a member of one or more social media networks (e.g., FACEBOOK,™ TWITTER,™ GROUPME,™ Google HANGOUTS,™ or the like). As part of these social media networks, the subscriber can have associated co-members (e.g., "Friends"), who share interests. For example, the subscriber can be a big fan of a particular European soccer club and can be member of several social media sites that focus on this club, soccer in general, or a particular player. In one or more embodiments, the ad-hoc multimedia conference generator 130 has permission to access private social media information 184 for this subscriber. For example, the subscriber can provide permission (e.g., Opt In) to ad-hoc multimedia conference generator 130 as part of joining the service. Or, permission can be afforded by the social media network as part of joining that service. When the ad-hoc multimedia conference generator 130 accesses the subscriber's social media information 184, it can access the subscriber's list of "friends" or "followers" and/or any affinity groups that she has joined. The ad-hoc multimedia conference generator 130 can access comments—which can be converted into anonymous comments to protect privacy—and/or reactions to comments of other members and/or links to content that are associated with the subscriber and/or social media group.

In one or more embodiments, the ad-hoc multimedia conference generator 130 can analyze the subscriber's social media information (including that of the subscriber's social media groups) to determine and/or suggest preference information for the subscriber. For example, the social media information can reveal an interest by the subscriber (or by some portion of her social group) in following a particular defender on her preferred soccer club based on her social media comments. In another example, a fellow social group member can indicate that he will be on the sidelines as a reporter at the coming match. In another example, the soccer team affinity site can have a set of media streams that it will be streaming for the coming match.

The ad-hoc multimedia conference generator 130 can aggregate this social media information and determine topics that may warrant further discussion in a conference. The combination of the subscriber's prior preference information and the preference information 134 that the ad-hoc multimedia conference generator 130 has recommended based on analysis of social media information 184 can be thought of as the subscriber's pre-defined interests (i.e., the interests that she brings with her). The ad-hoc multimedia conference generator 130 can mine these pre-defined interests to select and/or suggest a conference. In one or more embodiments, the subscriber can accept or reject conference invitations that are sent to their devices 106, 116 or 118 by the ad-hoc multimedia conference generator 130.

In one or more embodiments, a subscriber can interact with a social media network via a social media server 180 using social media streams that are monitored by the ad-hoc multimedia conference generator 130. For example, the subscriber can participate with a social media group at a social media network site or application on mobile device 116 while viewing an event, such as a television program, on a second device, such as computer device 118 or monitor 108. In another embodiment, the subscriber can experience the media streams via the social media network, itself, such that the media content channel and the social media network are the same. In one or more embodiments, the ad-hoc multimedia conference generator 130 can monitor subscriber interactions with the social media group that are occurring during the event. As the subscriber and/or other group members interact with the social media group, the ad-hoc multimedia conference generator 130 can monitor these interactions to determine whether or not to suggest a conference. Since the subscriber and the social group are "always" connected and interacting while the event media content is streaming, a feedback loop is created between the media content streams and the social interactions and reactions. This "always ON" feedback loop allows the ad-hoc multimedia conference generator 130 to suggest a conference in reaction to the social media for better determining the preferences and interests of the subscriber and group.

Figure 2:
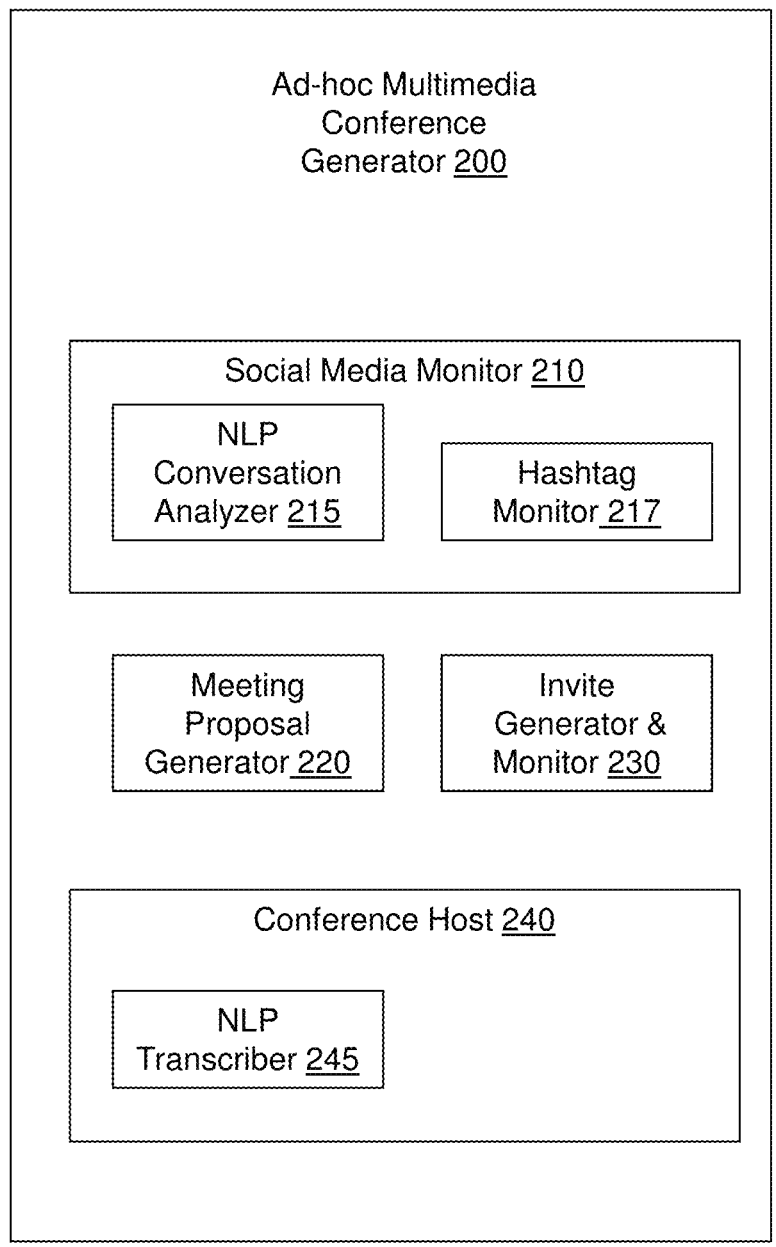
FIG. 2 depicts an illustrative embodiment of an ad-hoc multimedia conference generator.

FIG. 2 depicts an illustrative embodiment of an ad-hoc multimedia conference generator 200. The automated ad-hoc multimedia conference generator includes a social media monitor 210, a meeting proposal generator 220, a conference invite generator and monitor 230, and a conference host 240. In one embodiment, the social media monitor 210 includes a natural language conversation analyzer 215 and a key phrase monitor 217. In one or more embodiments, the natural language conversation analyzer 215 may use some form of machine categorization technology, in which conversation topics are established in the automated system by prior learning and/or other data acquisition, and then a live algorithm matches the live conversation with known categories to generate metadata that indicates collaboration concerning a topic. In one or more embodiments, natural language processing can be applied to the data, including remove stopwords, apply N-grams, POS (part-of-speech) tagging, TDIDF (term-frequency-inverse-document-frequency) to convert text into matrices, keyword or phrase extraction using NMF (non-negative matrix factorization), RAKE (rapid automatic keywords extraction) with modifications, LDA (latent Dirichlet allocation), field analysis, and/or text summarization such as using TextRank in Gensim package. In one or more embodiments, the natural language conversation analyzer 215 generates metadata from one or more of the aforementioned techniques of natural language processing analysis.

In one or more embodiments, the key phrase monitor 217 is a simpler hashtag monitoring process that is designed to pick up more direct terms that are "pre-provided" or even user generated, such as topic hashtags, subject lines of emails, titles of conference rooms, or stereotyped keywords or phrases that occur in the conversations. While a conversation moves forward on a social media stream (presumed consisting of a single medium, text, or perhaps audio conversation) natural language conversation analyzer 215 and key phrase monitor 217 categorize the conversation topics.

Once topics are generated, they are passed to the meeting proposal generator 220, which puts conference proposals together with the help of sematic association rules which consolidate individual topics into conference ideas. At the same time, identities of the people participating in the social media threads are tracked to match the topics. This generates a potential list of topics and associated people which could form "conference tables."

An invite generator and monitor 230 joins the social media conversation stream to suggest "break out groups" or converting the entire conversation to a conference. This invite generator and monitor 230 sends invites as suggested above, e.g. textual messages with links which can launch a separate audio and video sub-conference hosted by various conferencing technologies, such as WebEx, Internet Relay Chat (IRC), a standard audio conferencing bridge, or other methods such as the following:

| Initial Conversation Platform | Invitation Format | Secondary Conversation Platform |
|---|---|---|
| FACEBOOK ™ | Facebook Messenger | Facebook Live |
| FACEBOOK ™ Messenger | w/Link | Periscope |
| TWITTER ™ | Twitter direct messaging '@' | Google Hangouts WebEx |
| GROUPME ™ Group Texting | w/Link Email or IM w/Link | GoTo Meeting Cisco Telepresence |
| Internet Chat Room (e.g., BBS) | SMS text message Proprietary | Apple Facetime Group Video Chat |
| Proprietary Platform | Messaging | Skype Video Conference Proprietary Platform AT&T Connect audio/ video Telephone network conference call |

Next, a determination is made whether there is a sufficient level of interest, e.g., enough takers to an offer providing an indication of their willingness to participate in a conference. If so, a conference host 240 supplies access to the secondary conversation platform, such as an audio-video conference room, on the web, or an audio conference, over the telephone network.

In one or more embodiments, the ad-hoc multimedia conference generator 200 includes an additional element, a NLP transcriber 245. Transcriber 245 can be used to audio or video record or create written transcript of the secondary conversation. Furthermore, when used for a purpose, such as multipart negotiations, each secondary discussion may be thought of as a set of negotiable issues. Once a discussion has occurred on a topic, the transcript may be marked with a resolution, such as open, closed, or linked to other issues, creating a visual summary of the progress in negotiation.

In one embodiment, transcriber 245, can do two things as the conference proceeds: (a) store the conference conversation for later reference—providing links as enumerated above, and (b) contribute to the on-going main social media/texting stream by sending social media feedback posts, messages or other appropriate form of communication to the main social stream, to report progress, conclusion, and/or resolution of an issue. The system may create a text transcription of conversations in the room, or alternatively may have recorded them (depending on the configuration). In one embodiment, users may use the same link used to access the conference to retrieve the transcript or recorded conversation. Social media feedback messages can be generated in two ways (a) by users in the sub-conference directly or (b) by an automated process using the natural languages technologies discussed above (i.e. for conference topic generation), only this time to generate a relevant summary of conversation, and then create a social media post. At any time, sub-conference participants can enter or leave to join the main conversation, or continue both sub-conference and main conversation simultaneously.

Figure 3:
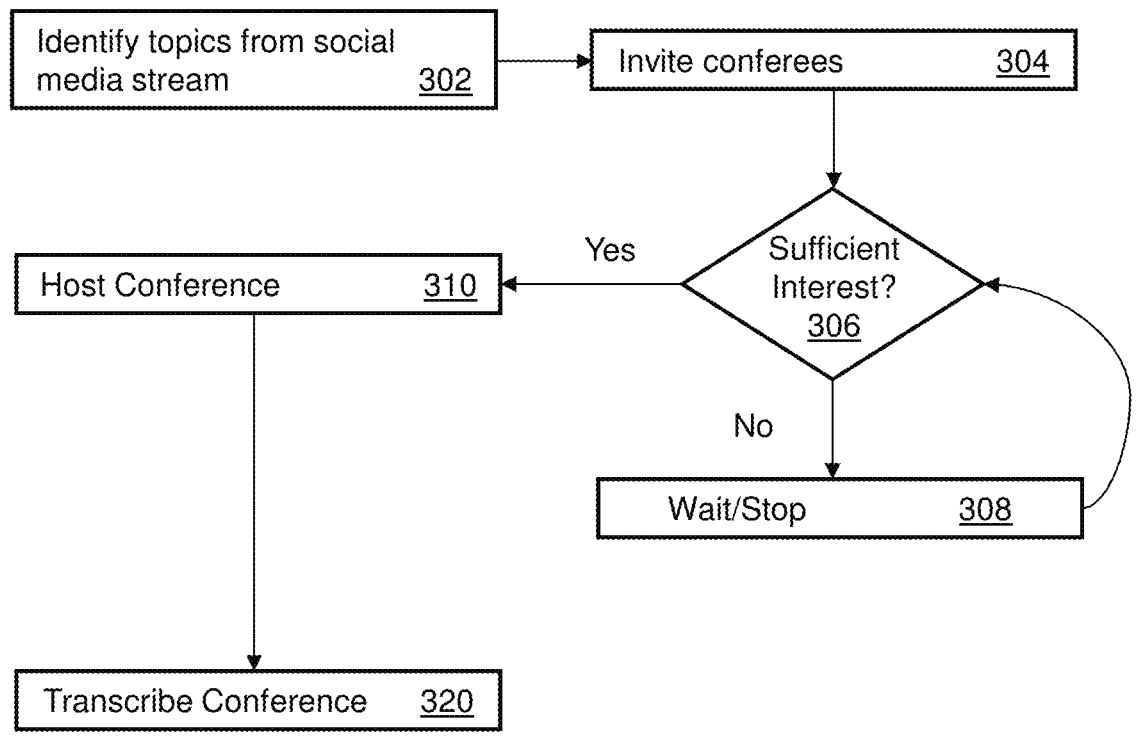
FIG. 3 depicts an illustrative embodiment of a method used in portions of the system described in FIGS. 1 and 2.

FIG. 3 depicts an illustrative embodiment of a method used by a system including an ad-hoc multimedia conference generator. As shown in FIG. 3, the method begins in step 302 with a topic identification process. The meeting proposal/topic identifying process monitors a social media stream to identify potential topics warranting further discussion. The process can use simple methods to identify topics in the social media stream, such as monitoring for hashtags in a twitter discussion, or can use sophisticated natural language processing to identify topics in the social media discussion, as set forth above. The process then continues in step 304.

In step 304, the topics and potential conference participants identified by the meeting proposal process are provided to the invite generator process. In one embodiment, the invite generator process joins the social media stream and suggests that the potential conference participants join a separate conference, such as a telephonic, video, or IP multimedia conference, that may be scheduled, or alternatively started once enough participants join, for example. The process continues at step 306.

In step 306, the system determines whether there is sufficient interest in participation in a conference. If there are enough potential conferees willing to join the conference, then the process continues at step 310. If there is an insufficient number of potential conferees, then the process progresses to step 308, where the system either waits for more potential conferees to show an interest, or the system terminates the conference.

In step 310, the system provides the conferees with instructions to attend the conference. In an embodiment, the system hosts the conference, although the conference may also be held on a third party platform, with the system participating as a silent conferee monitoring the conference.

During the conference, in step 320, the system monitors the conference and may provide feedback from the conference. The conference monitoring/feedback process monitors the conference through speech recognition and/or image recognition and analysis to transcribe the conference, and identify a summary of topics discussed as the conference proceeds. In an embodiment, the conference monitoring/feedback process may provide the summary and a link to the transcription back to the social media stream. Such feedback can include a summary of conclusions reached by the participants, or may include a transcription of the conference held.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
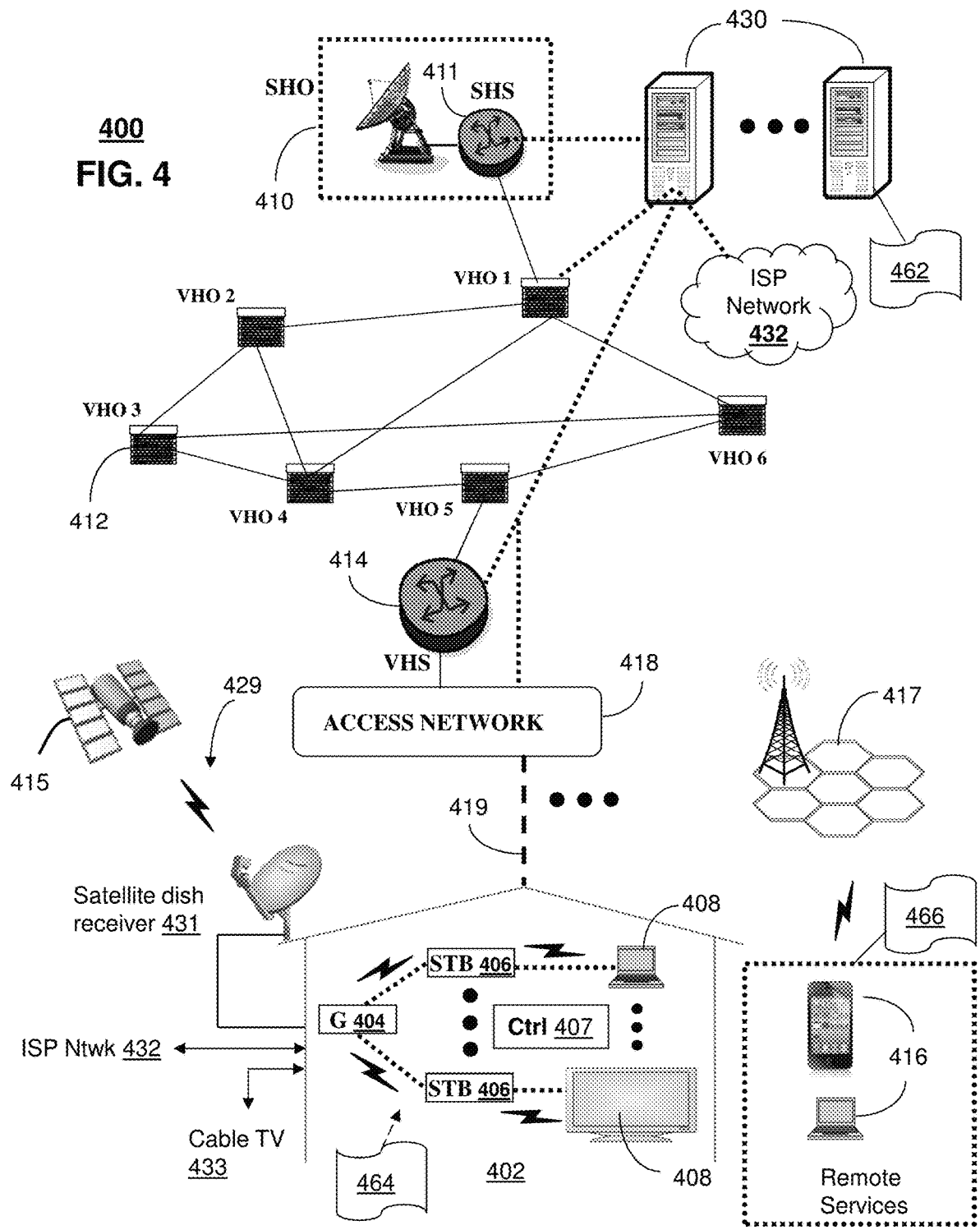
FIGS. 4-5 depict illustrative embodiments of communication systems that provide media services to the system described in FIGS. 1 and 2.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with communication system 100 and/or ad-hoc multimedia conference generator 200 of FIGS. 1 and/or 2 as another representative embodiment of communication system 400. For instance, one or more devices illustrated in the communication system 400 of FIG. 4 can perform the operations of one or more devices illustrated in communication system 100.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server (herein referred to as server 430). The server 430 can use computing and communication technology to perform function 462, which can include among other things, the techniques of an ad-hoc multimedia conference generator, described, for example, by method 300 of FIG. 3. For instance, function 462 of server 430 can be similar to the functions described for the ad-hoc multimedia conference generator 130 or subscription server of FIG. 1 in accordance with method 300. The media processors 406 and wireless communication devices 416 can be provisioned with software functions 464 and 466, respectively, to utilize the services of server 430. For instance, functions 464 and 466 of media processors 406 and wireless communication devices 416 can be similar to the functions described for media processor device 106, mobile device 116 or the computer device 118 of FIG. 1, as described above.

Figure 5:
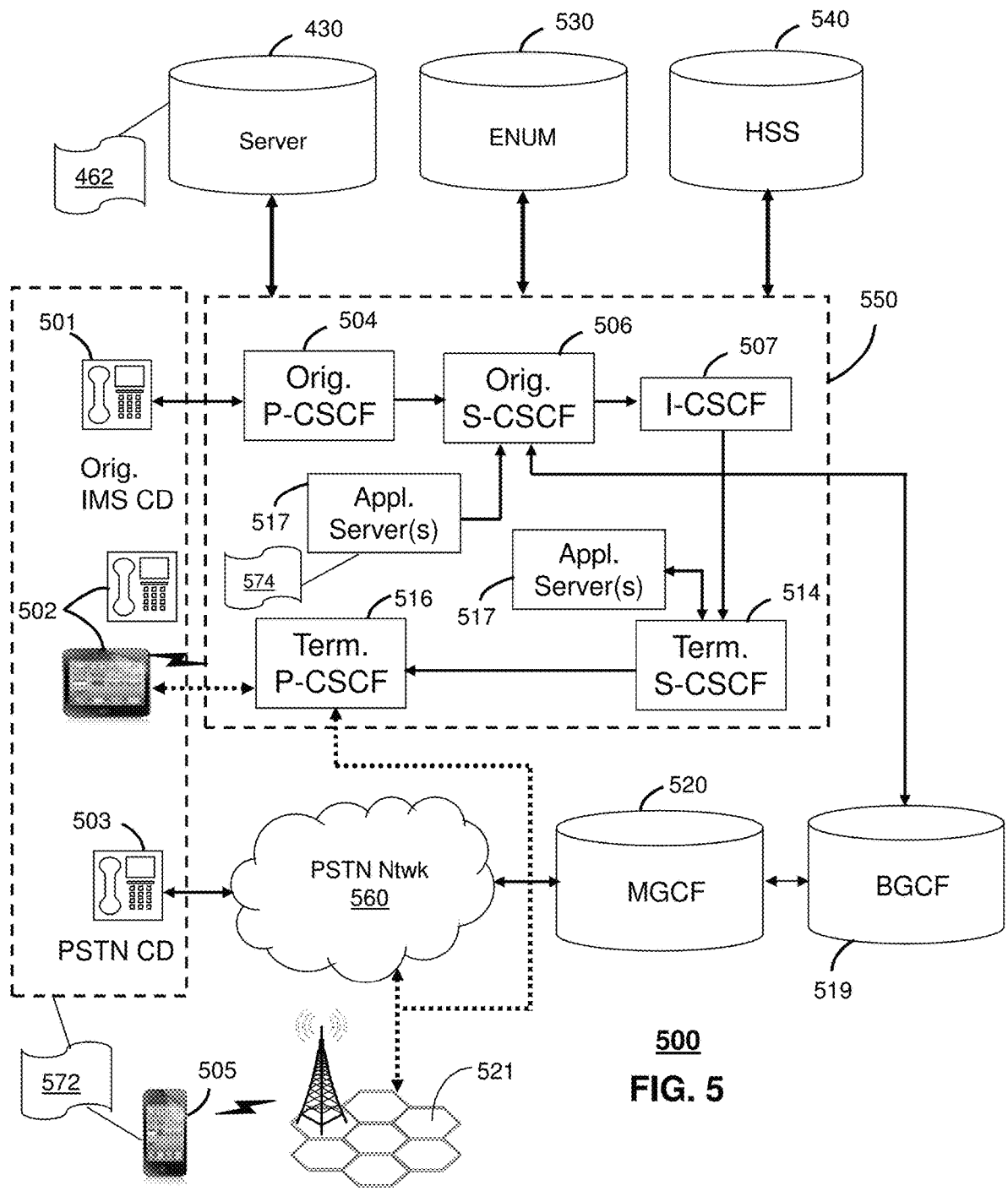

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with communication system 100 or ad-hoc multimedia conference generator 200 of FIGS. 1 and/or 2 and communication system 400 as another representative embodiment of communication system 400. In an embodiment, one or more application servers 517 may assist with or perform operations, such as: deriving a topic from a plurality of social media streams; obtaining identification information of a social media group associated with the plurality of social media streams; inviting members of the social media group to attend a conference on the topic based on the identification information; identifying a group of conference users participating in the conference; determining feedback data associated with the group of conference users; and/or providing feedback information indicative of the feedback data via a social media stream in the plurality of social media streams.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 462 and thereby provide ad-hoc multimedia conference generator or subscription services to the CDs 501, 502, 503 and 505 of FIG. 5 similar to the functions described for ad-hoc multimedia conference generator 130 or subscription server 135 of FIG. 1 in accordance with method 300 of FIG. 3. CDs 501, 502, 503 and 505, which can be adapted with software to perform function 572 to utilize the services of the server 430 similar to the functions described for mobile device 116, computer device 118 or media processor device 106 of FIG. 1 in accordance with method 300 of FIG. 3. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
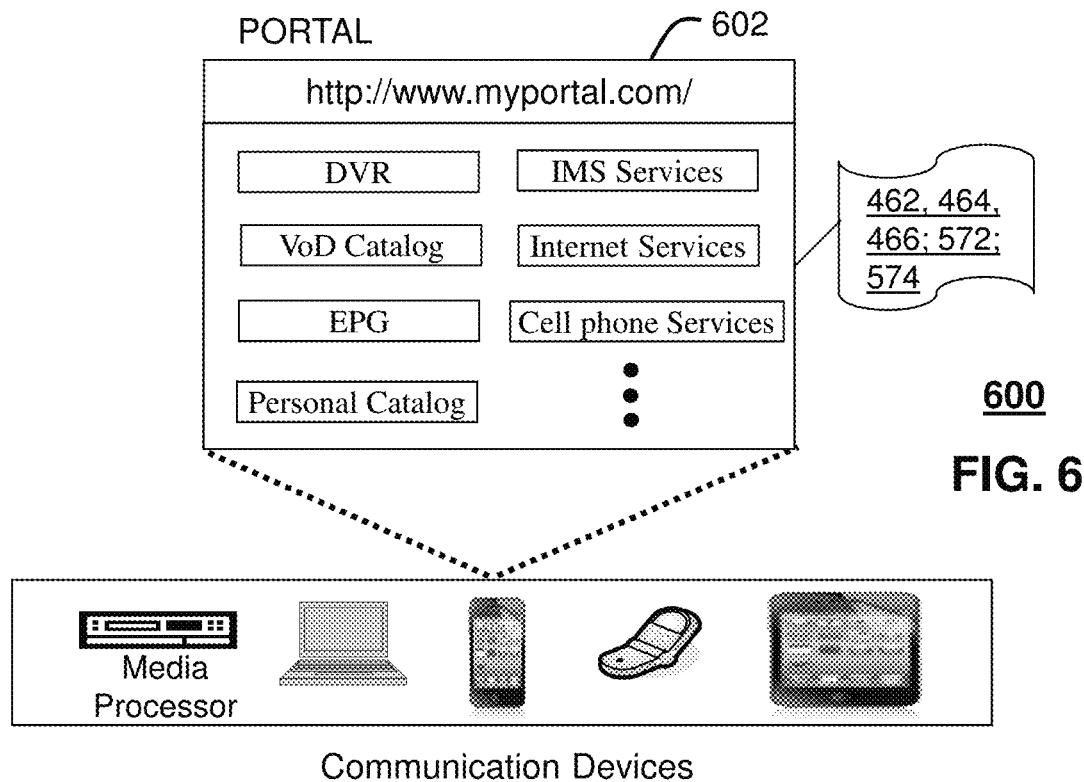
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with communication system 100 of FIG. 1, communication system 400, and/or communication system 500 as another representative embodiment of communication system 100 of FIG. 1, communication system 400, and/or communication system 500. The web portal 602 can be used for managing services of communication system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462, 464, 466, 572 and 574 to adapt these applications as may be desired by subscribers and/or service providers of communication system 100 of FIG. 1, and communication systems 400-500. For instance, users of the services provided by ad-hoc multimedia conference generator 130, subscription server 135 or server 430 can log into their on-line accounts and provision the servers with settings or preferences, as described above, that a user may want to program such as user profiles, provide contact information to server to enable it to communicate with devices described in FIGS. 1-5, and so on. Service providers can log onto an administrator account to provision, monitor and/or maintain the communication system 100 of FIG. 1 or server 430.

Figure 7:
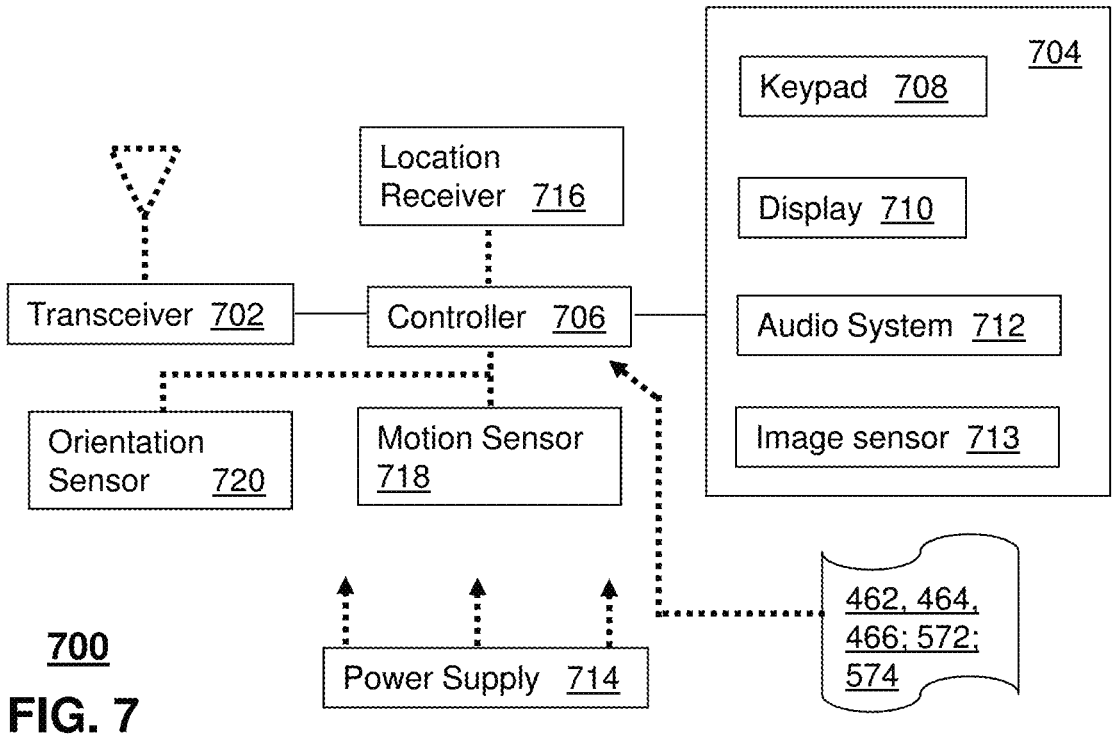
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-2 and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices 106, 116 or 118 of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication system 100 of FIG. 1, communication systems 400-500 of FIGS. 4-5 such as a gaming console and a media player. In addition, the controller 706 can be adapted in various embodiments to perform the functions 462, 464, 466, 572 and 574, respectively.

Upon reviewing the aforementioned embodiments, it would be evident to an artisan with ordinary skill in the art that said embodiments can be modified, reduced, or enhanced without departing from the scope of the claims described below. For example, text-to-speech applications can generate a stream of text from an audio conference. Feedback on the substance of the conference can be generated in a variety of ways, such as those disclosed by U.S. patent application, Ser. No. 14/963,287, filed Dec. 9, 2015, by Aguirre et al., entitled "METHOD AND APPARATUS FOR MANAGING FEEDBACK BASED ON USER MONITORING," which is incorporated by reference herein. Derived topics or synthesis of information can be performed in a number of different ways including keyword matching, image pattern recognition, comparison with historical participant information, and so forth. As an example, positive and negative feedback can be determined based on an analysis of particular information (e.g., text, images, and so forth), as well as a comparison of the particular information to past information (e.g., associated with some or all of the same participants in the conference) where the past information is known to have a particular feedback rating.

In yet another example, mission oriented teams can be created in a massive multiplayer online game (MMO). In this embodiment, players in a game learn of a very difficult quest, and a discussion ensues on social media, such as a discussion board, about how to approach the problem. By the nature of the difficult quest, small or disorganized teams would not have a chance of completing the quest. Various strategies, paths of attack, etc., may be proposed on the discussion board, and the system described herein may automatically create discussion board sub-rooms for each of the strategies proposed by the players. Within each sub-room, there may be one or more leaders that proposes the type of team(s) needed to assemble and execute a particular strategy advocated by the one or more leaders. Players new to the quest may read the discussion board and see the various strategies being described. Such players may then select a strategy that they prefer and join the sub-room to browse among the teams that are forming to execute that plan. These player(s) may then join a team that complements their abilities and has space in areas where the player(s) can contribute. The leader may accept or reject the new player from joining the team.

In yet another embodiment, somewhat analogous to the previous MMO gaming embodiment, but seeking a real-world goal, a large enterprise may wish to achieve a particular business need. Project managers of the large enterprise may post openings for teams that need to be formed. Employees working as internal consultants may then bid to join various teams where they may contribute to the project. As above, various discussion boards could be formed by the system, with conferences automatically scheduled. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
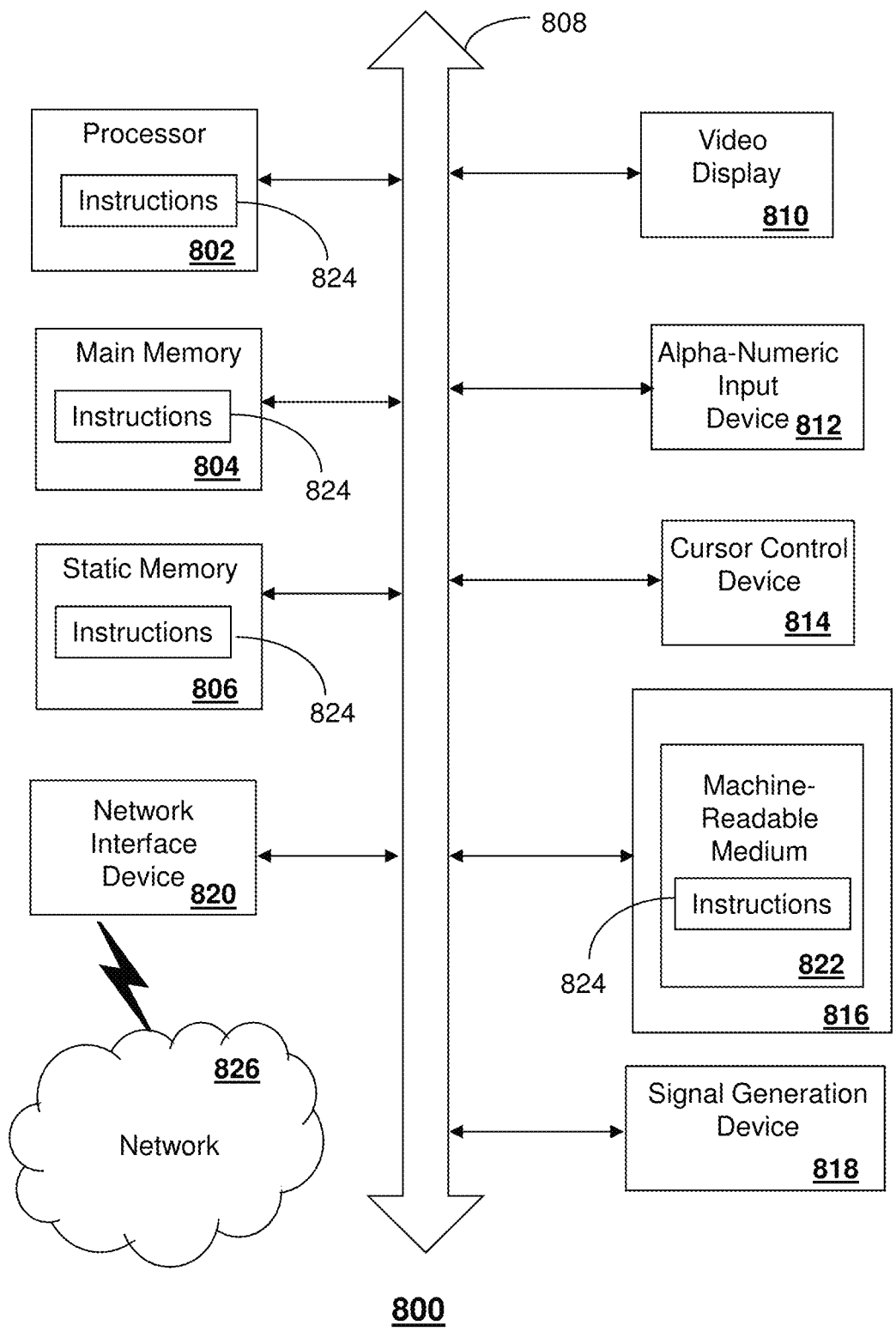
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 430 or the media processor 406 of FIG. 4, or the media processor device 106, mobile device 116, computer device 118, ad-hoc multimedia conference generator 130 or subscription server 135 of FIG. 1. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server device, comprising:
a memory that stores executable instructions; and
a processor communicatively coupled to the memory, wherein the processor, responsive to executing the executable instructions, performs operations comprising:
monitoring comments in an ongoing social media stream, wherein the ongoing social media stream is managed by an entity that is different from the entity operating the server device;
deriving a plurality of topics from the monitoring of the comments of the ongoing social media stream;
deriving a subject matter for a scheduled break-out conference that is separate from the ongoing social media stream, wherein the deriving the subject matter is based on the plurality of topics;
identifying members of social media groups associated with a group of social media platforms, including a social media platform hosting the ongoing social media stream, thereby creating a list of identified members, wherein the identifying of the members is based on determining matches with the plurality of topics;
sending an invitation to devices of the members of the list of identified members to attend the scheduled break-out conference on the subject matter;
hosting the scheduled break-out conference;
identifying a group of conference users participating in the scheduled break-out conference;
determining feedback data from the scheduled break-out conference; and
providing feedback information indicative of the feedback data as a comment in the ongoing social media stream, wherein the feedback information is generated from the feedback data in an automated process using a natural language processing to generate a summary of other comments made during the scheduled break-out conference.

2. The server device of claim 1, wherein the operations further comprise:
determining additional feedback data from the scheduled break-out conference; and
providing additional feedback information indicative of the additional feedback data as a subsequent comment in the ongoing social media stream, wherein the additional feedback information is generated from the additional feedback data in the automated process using the natural language processing to generate a subsequent summary of subsequent other comments made during the scheduled break-out conference.

3. The server device of claim 1, wherein the scheduled break-out conference includes multimedia presentations.

4. The server device of claim 1, wherein the scheduled break-out conference includes a text chat room.

5. The server device of claim 1, wherein the deriving the subject matter comprises generating metadata that indicates that first and second users of the social media groups are collaborating concerning the subject matter.

6. The server device of claim 5, wherein the metadata is generated through a natural language processing analysis.

7. The server device of claim 5, wherein the metadata is generated through a hashtag monitoring process.

8. The server device of claim 1, further comprising: determining whether a sufficient level of interest exists in a topic of the plurality of topics, wherein the sending of the invitation to the devices of the members of the social media groups is responsive to a determination of a sufficient level of interest.

9. The server device of claim 1, wherein the feedback data is determined from a natural language processing analysis of communications during the scheduled break-out conference.

10. The server device of claim 9, wherein the feedback data comprises a text transcription of conversations made during the scheduled break-out conference.

11. The server device of claim 1, wherein the feedback data comprises an audio recording of the scheduled break-out conference.

12. The server device of claim 1, wherein the feedback information comprises a link to the feedback data.

13. The server device of claim 1, wherein the processor comprises a plurality of processors operating in a distributed processing environment.

14. A machine-readable storage medium, comprising executable instructions that, when executed by a processing system including a processor, facilitate performance of operations, comprising:
- monitoring comments in an ongoing social media stream;
- identifying a plurality of topics from the monitoring of the comments of the ongoing social media stream;
- deriving a subject matter for a scheduled break-out conference that is separate from the ongoing social media stream, wherein the deriving the subject matter is based on the plurality of topics;
- identifying participants of social media groups associated with a group of social media platforms, including a social media platform hosting the ongoing social media stream, wherein the participants exhibit a sufficient level of interest in the topics, thereby creating a list of interested participants;
- sending an invitation to devices associated with the list of interested participants to attend the scheduled break-out conference on the subject matter;
- hosting the scheduled break-out conference;
- determining feedback data from the scheduled break-out conference; and
- providing feedback information indicative of the feedback data as a comment in the ongoing social media stream, wherein the feedback information is generated from the feedback data in an automated process using a natural language process to generate a summary of other comments made during the scheduled break-out conference.

15. The machine-readable storage medium of claim 14, wherein the identifying the plurality of topics further comprises keyword or phrase monitoring, field analysis, a natural language processing analysis, or a combination thereof.

16. The machine-readable storage medium of claim 14, wherein the sufficient level of interest is determined by receiving an indication from the participants of the social media groups of a desire to participate in the scheduled break-out conference on the subject matter.

17. The machine-readable storage medium of claim 14, wherein the feedback data comprises a conclusion of the subject matter discussed.

18. The machine-readable storage medium of claim 17, wherein the feedback information includes a social media post in the ongoing social media stream identifying the conclusion.

19. A method, comprising:
- monitoring, by a processing system including a processor, comments in an ongoing social media stream, wherein the ongoing social media stream is managed by an entity that is different from the entity operating the processing system;
- determining, by the processing system, a plurality of topics from the monitoring of the comments of the ongoing social media stream;
- deriving, by the processing system, a subject matter for a scheduled break-out conference that is separate from the ongoing social media stream, wherein the deriving the subject matter is based on the plurality of topics;
- identifying, by the processing system, participants in social media groups associated with a group of social media platforms, including a social media platform hosting the ongoing social media stream, thereby creating a list of contributors, wherein the identifying the participants is based on determining matches with the plurality of topics;
- offering, by the processing system, the scheduled break-out conference concerning the subject matter to contributors on the list of contributors, wherein the offering is made in the ongoing social media stream;
- receiving, by the processing system, acceptances to participate in the scheduled break-out conference;
- hosting, by the processing system, the scheduled break-out conference
- identifying, by the processing system, a group of conference users participating in the scheduled break-out conference;
- determining, by the processing system, feedback data from the scheduled break-out conference; and
- providing, by the processing system, feedback information indicative of feedback data as a comment in the ongoing social media stream, wherein the feedback information is generated from the feedback data in an automated process using natural language processing to generate a summary of other comments made during the scheduled break-out conference.

20. The method of claim 19, further comprising:
- transcribing, by the processing system, an audio recording of the scheduled break-out conference to text; and
- posting, by the processing system, a link to the text in the ongoing social media stream.

* * * * *